(12) United States Patent
Suzuki (10) Patent No.: US 6,311,964 B1
(45) Date of Patent: Nov. 6, 2001

(54) FLUID-FILLED VIBRATION DAMPING DEVICE WHOSE DAMPING CHARACTERISTICS ARE CONTROLLABLE

(75) Inventor: Tatsuya Suzuki, Kasugai (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/579,191

(22) Filed: May 26, 2000

(30) Foreign Application Priority Data

Jun. 2, 1999 (JP) .................................................. 11-155537

(51) Int. Cl.[7] .............................. F16F 13/26; B60K 5/12
(52) U.S. Cl. ........................................ 267/140.13; 267/219
(58) Field of Search .......................... 267/140.13, 140.11, 267/219, 220, 122, 35, 140.14, 140.12; 248/562, 638, 636

(56) References Cited

U.S. PATENT DOCUMENTS

| 4,756,513 | 7/1988 | Carlson et al. | 267/140.1 |
| 5,462,261 | 10/1995 | Eckel et al. | 267/140.13 |
| 5,639,073 * | 6/1997 | Suzuki et al. | 267/140.13 |
| 5,642,873 | 7/1997 | Kato | 267/140.14 |

FOREIGN PATENT DOCUMENTS

| 59-117929 | 7/1984 | (JP) . |
| 9-280304 | 10/1997 | (JP) . |
| 11230242 * | 8/1999 | (JP) . |

* cited by examiner

Primary Examiner—Douglas C. Butler
(74) Attorney, Agent, or Firm—Rossi & Associates (57) ABSTRACT

A fluid-filled vibration damping device including, an elastic body and a flexible diaphragm is divided by a partition member in to pressure-receiving and an equilibrium chambers communicating with each other through a first and second orifice passages. The second orifice passage includes a pair of split passages formed at respective circumferential positions of the partition member and is open at its first open end in the pressure-receiving chamber and at is its second open end located in the central portion of the partition member in the equilibrium chamber. A pair of movable members disposed in diametrically-opposite portions radially inward of the split passages. Each movable member is displaceable based on a pressure difference between a fluid pressure in the pressure-receiving chamber, and a fluid pressure in the equilibrium chamber applied to the other surface of the movable member. An actuator disposed below the flexible diaphragm remote from the equilibrium chamber and is operable to displace the flexible diaphragm, for inhibiting and permitting said fluid communication through the second orifice passage.

14 Claims, 3 Drawing Sheets

FLUID-FILLED VIBRATION DAMPING DEVICE WHOSE DAMPING CHARACTERISTICS ARE CONTROLLABLE

BACKGROUND OF THE INVENTION

1. Field of the Invention

The present invention relates generally to a fluid-filled vibration damping device adapted to provide a vibration damping or isolating effect on the basis of flows or resonance of a non-compressible fluid which is forced to flow through an orifice passage. More particularly, the present invention is concerned with such a fluid-filled vibration damping device which is capable of changing its damping characteristics by selectively enabling and disabling a first and a second orifice passages which are tuned to different frequency bands, depending upon the type of input vibrations having different frequencies, for thereby exhibiting an excellent vibration damping or isolating effect with respect to the input vibrations over a wide frequency range.

2. Description of the Related Art

As one type of a vibration damper interposed between two members of a vibration system, there is known a fluid-filled vibration damping device which is capable of changing its damping characteristics on the basis of flows or resonance of a non-compressible fluid which is forced to flow through a first or second orifice passages which are tuned to different frequency bands, by selectively operating the first and second orifice passages, depending upon the type of input vibrations having different frequencies. Such a fluid-filled vibration damping device, as disclosed in U.S. Pat. No. 5,642,873 and JP-A-9-280304, for example, includes a first mounting member and a second mounting member having a generally cylindrical shape, which are spaced apart from each other by a suitable distance and elastically connected to each other by an elastic body such that one of axially opposite open end of the second mounting member is fluid-tightly closed by the elastic body. The other open end of the second mounting member is fluid-tightly closed by a flexible diaphragm. Between the elastic body and the flexible diaphragm, there is disposed a partition member which is fixedly supported by the second mounting member. A pressure-receiving chamber which is partially defined by the elastic body is formed on one side of the partition member, while a variable-volume equilibrium chamber which is partially defined by a flexible diaphragm is formed on the other side of the partition member. These pressure-receiving and equilibrium chambers are filled with a suitable non-compressible fluid, and communicate with each other by a first orifice passage and a second orifice passage which is tuned to a frequency band higher than the frequency band to which the first orifice passage is tuned, which first and second orifice passages are formed in the partition member. An actuator is disposed on one side of the flexible diaphragm remote from the equilibrium chamber and is adapted to move the flexible diaphragm toward and away from one opening of the second orifice passage so that the flexible diaphragm is pressed onto and retracted from the open end of the second orifice passage for closing and opening the same. Thus, the vibration damping device can change its damping characteristics, by selectively controlling the second orifice passage to be operative and inoperative for permitting and inhibiting the fluid communication therethrough.

The above type of the vibration damping device may exhibit a desired vibration damping effect based on the flows or resonance of the fluid flowing through the first and second orifice passages, with respect to the input vibrations over two different frequency bands to which the first and second orifice passages are respectively tuned. However, this type of vibration damping device may suffer from a significant deterioration of its vibration damping characteristics, especially upon application of vibrations having a frequency band higher than that the frequency band to which the second orifice passage is tuned, due to a significant increase of resistance to the fluid flow through any of the first and second orifice passages. It is therefore required a further improved vibration damping device which is capable of exhibiting an excellent damping effect over a wide frequency range, especially in a high frequency band.

To meet the above requirement, there has been proposed another type of the fluid-filled vibration damping device wherein a movable plate is supported by the partition member so as to be movable in a slight amount of distance between the pressure-receiving chamber and the equilibrium chamber. One of opposite major surfaces of the movable plate is subjected to a pressure of the fluid in the pressure-receiving chamber, while the other surface of the movable plate is subjected to a pressure of the fluid in the equilibrium chamber. Upon application of the high-frequency vibration to this type of the vibration damping device, the pressure change of the fluid in the pressure-receiving chamber may be absorbed or reduced by a displacement of the movable plate that is caused by a pressure difference between the fluid in the pressure-receiving chamber and the fluid in the equilibrium chamber.

However, the above type of the vibration damping device may suffer from a problem of difficulty in obtaining a sufficient space for accommodating the movable plate in the partition member wherein the first and second orifice passages have already been formed, resulting in an inevitable increase in the size of the partition member and a complication of the structure of the partition member. It is therefore a significant point how to arrange the movable member in the partition member with a sufficiently large size required for an effective operation thereof to absorb the pressure change in the pressure-receiving chamber, without requiring an desirable increase in size of the partition member. In particular, a degree of freedom in tuning of the first and second orifice passages, e.g., in determining the lengths or the cross-sectional areas of the first and second orifice passages, may possibly be restricted, depending upon the position of the movable plate in the partition member. In addition, the accommodation of the movable plate in the partition member is likely to restrict a freedom in determining positions of opposite openings of the second orifice passage, leading to an undesirable limitation of a freedom in determining a movable portion of the flexible diaphragm at which the flexible diaphragm is pressed onto or retracted from one of the openings of the second orifice passage. The inadequate selection of the movable portion of the flexible diaphragm due to the restriction of the above-indicated freedom in determining the movable portion, may possible cause a significant adverse influence on a durability of the flexible diaphragm and an efficiency of movement of the movable portion of the flexible diaphragm.

SUMMARY OF THE INVENTION

It is therefore an object of this invention to provide a fluid-filled vibration damping device which provides a high degree of freedom in tuning a first and a second orifice passage, in particular, in determining cross sectional areas and lengths of the first and second orifice passages, while providing an sufficient space for accommodating a movable plate in a partition member with effective space utilization, so that the fluid-filled vibration damping device is capable of exhibiting an excellent vibration damping or isolating effect with respect to the input vibrations over a wide frequency range.

The above object of the invention may be achieved according to the principle of the present invention, which provides a fluid-filled vibration damping device comprising: (a) a first mounting member and a second mounting member including a cylindrical portion, which are spaced apart from each other such that one of axially opposite open end of said cylindrical portion of the second mounting member is opposed to the first mounting member; (b) an elastic body elastically connecting the first and second mounting member such that the one of axially opposite open ends of the cylindrical portion of the second mounting member is fluid-tightly closed by the elastic body; (c) a flexible diaphragm fluid-tightly closing the other open end of the cylindrical portion of the second mounting member; (d) a partition member having a generally cylindrical shape, which is disposed between the elastic body and the flexible diaphragm fixedly supported by the second mounting member, the partition member cooperating with the elastic body to define therebetween a pressure-receiving chamber filled with a non-compressible fluid, to which a vibrational load is applied, and cooperating with the flexible diaphragm to define therebetween an equilibrium chamber filled with the non-compressible fluid, the volume of which is variable; (e) a first orifice passage formed in the partition member for fluid communication between with the pressure-receiving chamber and the equilibrium chamber; (f) a second orifice passage formed in the partition member and communicating at a first open end thereof with the pressure-receiving chamber and at a second open end thereof with the equilibrium chamber for fluid communication between the pressure-receiving chamber and the equilibrium chamber, the second orifice passage being tuned to a frequency band higher than a frequency band to which the first orifice passage is tuned; (g) the second orifice passage including a pair of split passages formed at respective circumferential positions of the partition member that are opposed to each other in a diametric direction of the partition member, and each extending in a circumferential direction of the partition member with a circumferential length substantially equal to a value corresponding to a half of an entire circumference of the partition member, the pair of the split passages being open at ones of opposite circumferential ends thereof to the pressure-receiving chamber through the first open end of said second orifice passage, and being joined together at the other circumferential ends at a first circumferential positions of the partition member and radially inwardly extend from the first circumferential position to a substantially central portion of the partition member at which the other circumferential ends of the split passages are open to said equilibrium chamber through the second open end of the second orifice passage; (h) a pair of movable members respectively disposed in diametrically-opposite radially intermediate portions of the partition member so as to extend between the respective sprit passages and the second open end of the second orifice passage, each of the movable members being displaceable by a suitable amount of distance, based on a pressure difference between a pressure of the fluid in said pressure-receiving chamber which is applied to one of opposite surfaces of the movable member, and a pressure of the fluid in said equilibrium chamber which is applied to the other surface of the movable member; and (i) an actuator disposed on one of opposite sides of said flexible diaphragm remote from the equilibrium chamber and being operable to displace the flexible diaphragm in a direction toward and away from the second open end of the second orifice passage formed in the partition member, so as to close and open the second orifice passage, for inhibiting and permitting the fluid communication through said second orifice passage.

In the fluid-filled elastic mount constructed according to the above mode of the invention, the second orifice passage is divided into the pair of the split passages at an intermediate portion between the first open end open in the pressure-receiving chamber and the second open end open in the equilibrium chamber, such that the sprit passages are located in the respective circumferential positions of the partition member that are opposed to each other in a diametric direction of the partition member, and extend in the circumferential direction with the circumferential length substantially equal to a half of the value of the circumference of the partition member. This arrangement permits the second orifice passage having a length which is made larger than a half of the circumference of the partition member, and having a cross sectional area which is entirely increased. Thus, the fluid-filled vibration damping device of the present invention provides a high degree of freedom in tuning the second orifice passage, while effectively increasing the amount of the flow of the fluid flowing through the second orifice passage, resulting in an improved vibration damping effect based on the flow of the fluid.

Further, the second open end of the second orifice passage is located and open in the central portion of the partition member for the fluid communication with the equilibrium chamber, so that the central portion of the flexible diaphragm is moved toward and away from the second open end of the second orifice passage for closing and opening the second orifice passage from and to the equilibrium chamber. This arrangement is effective to avoid a partial deformation of the flexible diaphragm and a resultant concentration of the stress to the local portion of the flexible diaphragm, resulting in an improved durability of the flexible diaphragm. It is preferable that the flexible diaphragm has a relatively-large thickness in its central portion. Further, the deformation of the flexible diaphragm is effectively provided in its circumferential portion, even when the central portion of the flexible diaphragm is pressed onto the second open end of the second orifice passage. Thus, a required amount of volumetric change in the equilibrium chamber is effectively obtained, assuring a high damping effect based on the flow of the fluid flowing through the first orifice passage, when the second orifice passage is closed by the central portion of the flexible diaphragm.

The use of the second orifice passage arranged in the partition member as described above makes it possible to provide a pair of spaces for accommodating the movable members in the partition member, such that the pair of spaces extend in respective circumferential positions that are opposed to each other in the diametric direction of the partition member, and are disposed radially outwardly of the second open end and radially inwardly of the split passages, respectively. Thus, the present vibration damping device can obtain the sufficiently large space for accommodating the movable member, while maintaining the required length and cross sectional area of the second orifice passage. That is, the second orifice passage and the movable members are arranged in the partition member with high space utilization. Accordingly, the present vibration damping device can effectively provide the high degree of freedom in tuning the second orifice passage and the movable members, and can effectively obtain the desired amount of flow of the fluid flowing through the second orifice passage and the desired amount of flow of the fluid caused by the displacement of the movable members, without requiring a significant increase in the size of the partition member and the vibration damping device. Thus, the present vibration damping device permits an improved vibration damping effect by utilizing the above-indicated flow of the fluid.

The partition member may preferably be made of hard materials such as metal and synthetic resin materials so that the partition member is resistive to pressure applied thereto in the actual use. The flexible diaphragm is required to be impermeable, and may be formed of a thin rubber layer, an easily deformable resin layer, or the like. The thin rubber layer may be reinforced by applying a canvas, as needed. Any types of actuators may be employed in the present vibration damping device, provided the actuator is capable of reciprocally moving the central portion of the flexible diaphragm toward and away from the second open end of the second orifice passage. For instance, the actuator may comprises either a pneumatically operated actuator which includes an air-tightly closed working air chamber and a movable plate as an output member which is displaced based on a pressure change in the working air chamber, or alternatively an electromagnetic-type or an electric-type actuator which includes an output member that is displaced based on an electromagnetic force or a magnetic force. It may be preferably that the output member of the actuator is secured to the central portion of the flexible diaphragm, for thereby preventing a damage of the flexible diaphragm due to friction between the output member and the flexible diaphragm. The central For assuring a desired length of the second orifice passage, it is preferable that the circumferential ends of the respective split passages on the side of the first open end of the second orifice passage further extend in the circumferential direction to be joined together, and are open to the pressure-receiving chamber through a single first open end of the second orifice passage. It is also possible that the circumferential ends of the sprit passages on the side of the first open end of the second orifice passage may be terminated at respective circumferential positions which are spaced apart from each other in the circumferential direction, and are open to the pressure-receiving chamber through respective first open ends of the second orifice passage. This arrangement may be modified such that the circumferential ends of the respective split passages on the side of the first open end extend in the circumferential direction and independently extend radially inwardly, without being joined together, so as to independently be open to the pressure-receiving chamber through the respective first open ends of the second orifice passage.

In one advantageous arrangement of the above preferred form of the invention, the sprit passages are also joined together at the ones of opposite circumferential ends thereof at a second circumferential position of the partition member and radially inwardly extend from the second circumferential position to a radially inward portion of the partition member at which the ones of opposite circumferential ends of the sprit passages are open to the pressure-receiving chamber through the first open end of the second orifice passage, the second circumferential position being diametrically opposed to the first circumferential position at which the other circumferential ends of the sprit passages are joined together. In this arrangement, the second orifice passages can be maximally extended on the side of the first open end of the second orifice passage, without restricting the space for accommodating the movable members.

According to another preferred form of this invention, the first and second orifice passages are formed in the circumferential portion of the partition member such that the first and second orifice passages are superposed on each other in the axial direction of the partition member, and extend in the circumferential direction of the partition member, the first orifice passage being located adjacent to the equilibrium chamber so that the first orifice passage being held in fluid communication with the pressure-receiving chamber through the second orifice passage. In this arrangement, not only the second orifice passage but also the first orifice passage can be formed in the circumferential portion of the partition member so as to extend along the circumference of the partition member, whereby the first orifice passage as well as the second orifice passage can be formed with a sufficient length, without requiring an increase in the size of the partition member and/or the vibration damping device.

According to a further preferred form of this invention, the partition member includes: a cylindrical body member having a groove open in one of opposite surfaces thereof, and a pair of accommodating recesses which are respectively disposed in diametrically-opposite portions located radially inward of the groove, the accommodating recesses being open in the one of opposite surfaces of the partition member and being adapted to accommodate therein the pair of said movable members, respectively; and a closure member superposed on the one of opposite surfaces of the body member so as to close openings of the groove to define therebetween the second orifice passage and so as to close the openings of the pair of the accommodating recesses in order to support therebetween the movable members, the closure member including first communication passages formed therethrough at respective portions located adjacent to the pair of the accommodating recesses, so that the pressure of the fluid in the pressure-receiving chamber is applied to ones of opposite surfaces of the movable members through the first communication passage, respectively, and bottom walls of the pair of the accommodating recesses having second communication passages formed therethrough, so that the pressure of the fluid in the equilibrium chamber is applied to the other surfaces of the movable members through the second communication passages, respectively.

In this preferred form of the invention, the second orifice passage and the pair of the movable members can be arranged in the partition member with an improved space utilization and with a simple structure. Particularly, the closure member may be a plate member having a simple configuration and made of metal or a resin material, for example, leading to improved efficiency and reduced cost of manufacture of the vibration damping device. Each of the movable members may be formed of a plate member and may be accommodated in the accommodating recess such that the plate member is not supported by the partition member so that the plate member is movable between the bottom surface of the accommodating recess and the closure member without any restriction. Alternatively, the movable members may be formed of an elastically deformable rubber plate, and may be accommodated in the accommodating recess such that the rubber plate is supported by the partition member such that the peripheral portion of the rubber plate is compressed by and between the bottom surface of the accommodating recess and the closure member, for thereby allowing the elastic deformation of the rubber plate at its center portion.

According to still further preferred form of the invention, the partition member includes a circumferential groove extending in an circumferential direction thereof and being open in an outer circumferential surface thereof, an opening of the circumferential groove is fluid-tightly closed by the cylindrical portion of the second mounting member to thereby define the first orifice passage. This arrangement is effective to obtain a desired length of the first orifice passage, with an extremely simple structure, resulting in a high degree of freedom in tuning the first orifice passage.

According to a yet further preferred form of this invention, the actuator comprises a pneumatically-operated actuator including a fluid-tightly closed working air chamber and a piston member which is movable toward and away from the partition member based on a change of an air pressure applied to the working air chamber, the piston member being moved toward and away from the partition member so as to displace the flexible diaphragm toward and away from the partition member. This arrangement advantageously provides the actuator which is compact in size and weight. Particular, the present fluid-filled vibration damping device is used for an automotive vehicle, and the air intake system of the engine of the vehicle can be used as the vacuum source, so that the vacuum source and the atmosphere which are required for operating the actuator can be easily obtained, eliminating need for preparing a power source for the actuator. Therefore, the vibration damping device according to this preferred form of the invention requires is effectively operated for changing the damping characteristics thereof.

BRIEF DESCRIPTION OF THE DRAWINGS

The above and other objects, features and advantages of the present invention will be better understood by reading the following detailed description of a presently preferred embodiment or forms of the invention, by reference to the accompanying drawings, in which.

DETAILED DESCRIPTION OF THE PREFERRED EMBODIMENTS

Figure 1:
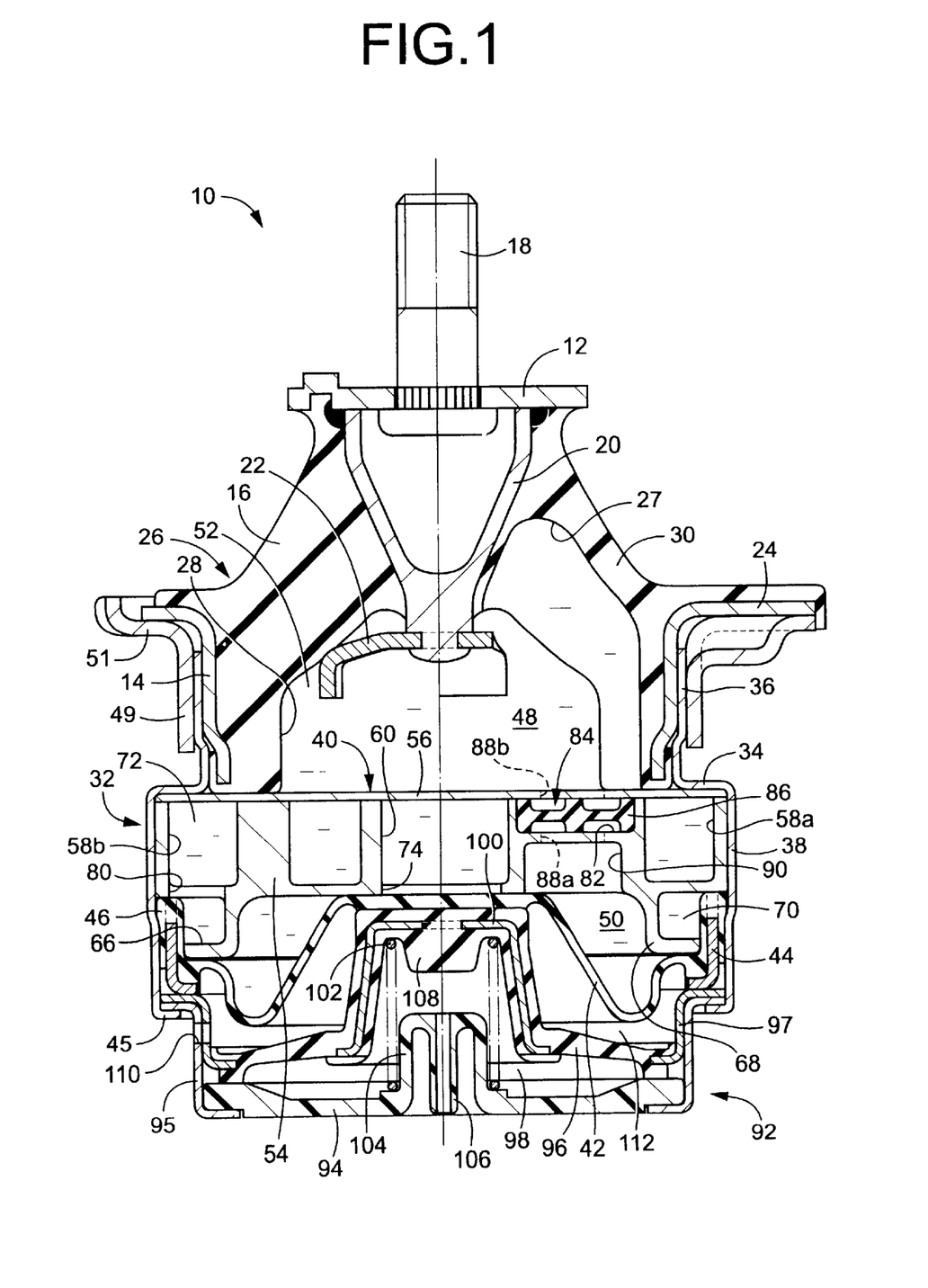
FIG. 1 is an elevational view in longitudinal or axial cross section of an engine mount constructed according to one embodiment of the invention, taken along line 1—1 of FIG. 2.

Referring first to FIG. 1, there is shown one embodiment of a fluid-filled vibration damping mount of the present invention in the form of an engine mount 10 for use on an automotive vehicle. The engine mount 10 has a first mounting member 12 and a second mounting member 14 which are both made of metallic materials and which are disposed in mutually opposed and spaced-apart relationship with each other. The first and second mounting members 12, 14 are elastically connected to each other by an elastic body 16 made of a rubber material, and are attached to one and the other of the power unit and the body of the automotive vehicle, so that the power unit which includes an engine is mounted on the vehicle body in a vibration damping manner. With the engine mount 10 installed on the vehicle as described above, the elastic body 16 is held elastically compressed with the weight of the power unit acting on the engine mount 10, so that the first and second mounting members 12, 14 are displaced by a suitable amount in the direction in which the two mounting members 12, 14 are opposed to each other, namely in the vertical direction as seen in FIG. 1 and in a direction almost parallel to the vertical direction. The engine mount 10 receives a vibrational load primarily in the vertical direction as seen in FIG. 1.

The first mounting member 12 has a disk-like shaped metallic member, and includes an amounting screw 18 extending upwards from its central portion and a support rod 20 extend downwards from its central portion. The support rod 20 is a hollow inverted-conical shaped metallic member. An inverted cup-shaped resonance member 22 is secured by calking to a lower axial end of the support rod 20. This resonance member 22 generally extends from the support rod 20 radially outwardly in a direction substantially perpendicular to the axial direction, i.e., the load-receiving direction. The first mounting member 12 is fixed at its mounting screw 18 to the power unit (not shown) of the vehicle.

The second mounting member 14 is a generally cylindrical metallic member having a relatively large diameter. The second mounting member 14 has an integrally-formed outward flange portion 24 extending radially outwards from an upper open end thereof with a given radial width. The first mounting member is spaced-apart from the second mounting member 14 in the axial direction, by a suitable distance from the upper open end of the second mounting member 14. The first and second mounting members 12, 14 are disposed in a co-axial relationship with each other. The elastic body 16 interposed between these two members 12, 14 has generally frustoconical shape including a cavity 28 open in its large diameter end portion, and is bonded at its small-diameter end face to the first mounting member 12, and at the outer circumferential surface of its large-diameter end to the inner circumferential surface of the upper open end of the second mounting member 14, during vulcanization of a rubber material of the elastic body 16. Thus, the first mounting member 12, second mounting member 14 and elastic body 16 are formed into an integral intermediate product by means of the vulcanization, so that the upper open end of the second mounting member 14 is fluid-tightly closed by the elastic body 16. The support rod 20 fixed to the first mounting member 12 extend through the elastic body 16 in the axially downward direction so that the axially lower end of the support rod 20 protrudes from the elastic body 16, and the resonance member 22 secured to the lower end of the support rod 20 is accordingly disposed within the cavity 28 of the elastic body 16.

The elastic body 16 has at least one pocket 27 formed in an outer circumferential portion thereof, and open in its large-diameter end portion so as to communicate with the interior space of the second mounting member 14. Therefore, the wall thickness of the elastic body 16 is reduced at a portion in which the pocket 27 is formed to a value corresponding the wall thickness of the bottom wall 30 of the pocket 27, facilitating an elastic deformation of the elastic body 16. The number of the pocket 27 may be suitably determined and rot particularly limited. When a plurality of pocket 27 are formed, the pockets 27 are spaced apart from each other in a circumferential direction of the elastic body 16.

On the side of the lower open end portion of the second mounting member 14, a metallic support sleeve 32 having a generally cylindrical shape is press fitted onto the outer circumferential surface of the second mounting member 14. Within the bore of the support sleeve 32, there are incorporated a partition member 40 and a flexible diaphragm 42, so that that the partition member 40 and the flexible diaphragm 42 are disposed below the elastic body 16 with a predetermined spacing in the axial or vertical direction. The support sleeve 32 has a shoulder 34' at an axially intermediate portion thereof, and includes a small-diameter portion on the upper side of the shoulder 34, and a large-diameter portion 38 on the lower side of the shoulder 34. The partition member 40 is made of hard materials such as a metallic material and a synthetic resin material, and has a substantially thick-walled disk-like shape. The flexible diaphragm 42 is a thin-walled deformable rubber film. A metal ring 44 is bonded to the peripheral portion of the flexible diaphragm 42 in the process of vulcanization of a rubber material for forming the flexible diaphragm 42.

The partition member 40 and the flexible diaphragm 42 are inserted into the bore of the large-diameter portion 38 of the support sleeve 32 in this order. Then, the large-diameter portion 38 of the support sleeve 32 is subjected to a suitable drawing operation, so that the large-diameter portion 38 of the support sleeve 32 is fixedly secured to the circumference surfaces of the partition member 40 and the flexible diaphragm 42. In addition, the lower open end of the large-diameter portion 38 of the support sleeve 32 is subjected to a suitable calking operation to form a calking portion 45, so that the partition member 40 and the flexible diaphragm 42 superposed on each other in the axial direction, are clamped by and between the shoulder 24 and the calking portion 45, whereby the partition member 40 and the flexible diaphragm 42 are pressed against each other by the support sleeve 32 in the axial direction thereof. The inner and outer circumferential surface of the metal ring 44 is entirely covered by a sealing rubber layer 46, whereby the flexible diaphragm 42 is fluid-tightly secured to the large-diameter portion 38 of the support sleeve 32.

On the other hand, the small-diameter portion 36 of the support sleeve 32 is radially outwardly disposed on the second mounting member 14, and fixedly secured to the outer circumferential surface of the second mounting member 14 by a press-fitting operation, a drawing operation, or the like. A sealing rubber layer is interposed between and compressed by the small-diameter portion 36 of the support sleeve 32 and the second mounting member 14, for thereby assuring a fluid tightness therebetween. The engine mount 10 further includes a bracket 49 which is press-fitted onto the outer circumferential surface of the small-diameter portion 36 of the support cylinder 32. The bracket 49 has a generally cylindrical member having a relatively large diameter, and includes a integrally-formed outward flange portion 51 extending radially outwardly from its axially upper open end. The outward flange portion 51 of the bracket 49 is placed on the lower end face of the outward flange portion 24 of the second mounting member 14. The second mounting member 14 is fixed to the body (not shown) of the automotive vehicle via the bracket 49.

With the small-diameter portion 36 of the support sleeve 32 press-fitted onto the second mounting member 14, the lower end face of the elastic body 16 is forcedly pressed onto the upper end face of the partition member 40 at the peripheral portion of the opening of the cavity 28, whereby, the opening of the cavity 28 of the elastic body 16 is fluid tightly closed by the partition member 40. In this condition, the partition member 40 cooperates with the elastic body 16 to define therebetween a pressure-receiving chamber 48 on its axially upper side, and cooperates with the flexible diaphragm 42 to define therebetween an equilibrium chamber 50 on its axially lower side. The pressure-receiving chamber 48 and the equilibrium chamber 50 are both filled with a suitable non-compressible fluid. The non-compressible fluid filling the pressure-receiving chamber 48 and the equilibrium chamber 50 is preferably selected from among water, alkylene glycol, polyalkylene glycol and silicone oil, for instance. To assure an excellent vibration damping effect of the engine mount 10 based on a flow or a resonance of the non-compressible fluid, the non-compressible fluid desirably has a viscosity not higher than 0.1 Pa·s. The filling of the non-compressible fluid to the pressure-receiving and equilibrium chambers 48, 50 is advantageously conducted by press-fitting the support cylinder 32 wherein the partition member 40 and the flexible diaphragm 42 are incorporated as discussed above, on the second mounting member 14 of the intermediate product constituted by the first and second mounting members 10, 12 and elastic body 16, in the mass of the selected non-compressible fluid.

Upon application of the vibrational load between the first and second mounting member 12, 14, the pressure of the fluid in the pressure-receiving chamber 48 varies due to elastic deformation of the elastic body 16, while the volume of the equilibrium chamber 48 is permitted to vary by displacement of the flexible diaphragm 42.

With the engine mount 10 constructed as described above installed on the vehicle as mentioned above, the elastic body 16 is held elastically compressed with the weight of the power unit acting on the engine mount 10, so that the resonance member 22 is disposed in a central portion of the pressure-receiving chamber 48. The periphery of the resonance member 22 cooperates with the corresponding portion of the inner surface of the pressure-receiving chamber 48 to define an annular restricted fluid passage 52. The resonance member 22 is displaced within the pressure-receiving chamber 48 in the axial direction (the load-receiving direction), together with the first mounting member 12, upon application of the vibrational load between the first and second mounting members 12, 14, so that the fluid in the pressure-receiving chamber 48 is forced to flow through the restricted fluid passage 52. In the present embodiment, the restricted fluid passage 52 is tuned to provide a sufficient vibration isolating effect based on resonance of the fluid flowing through the restricted fluid passage 52, with respect to high-frequency vibrations such as booming noises generated during high-speed running of the vehicle.

Figure 2:
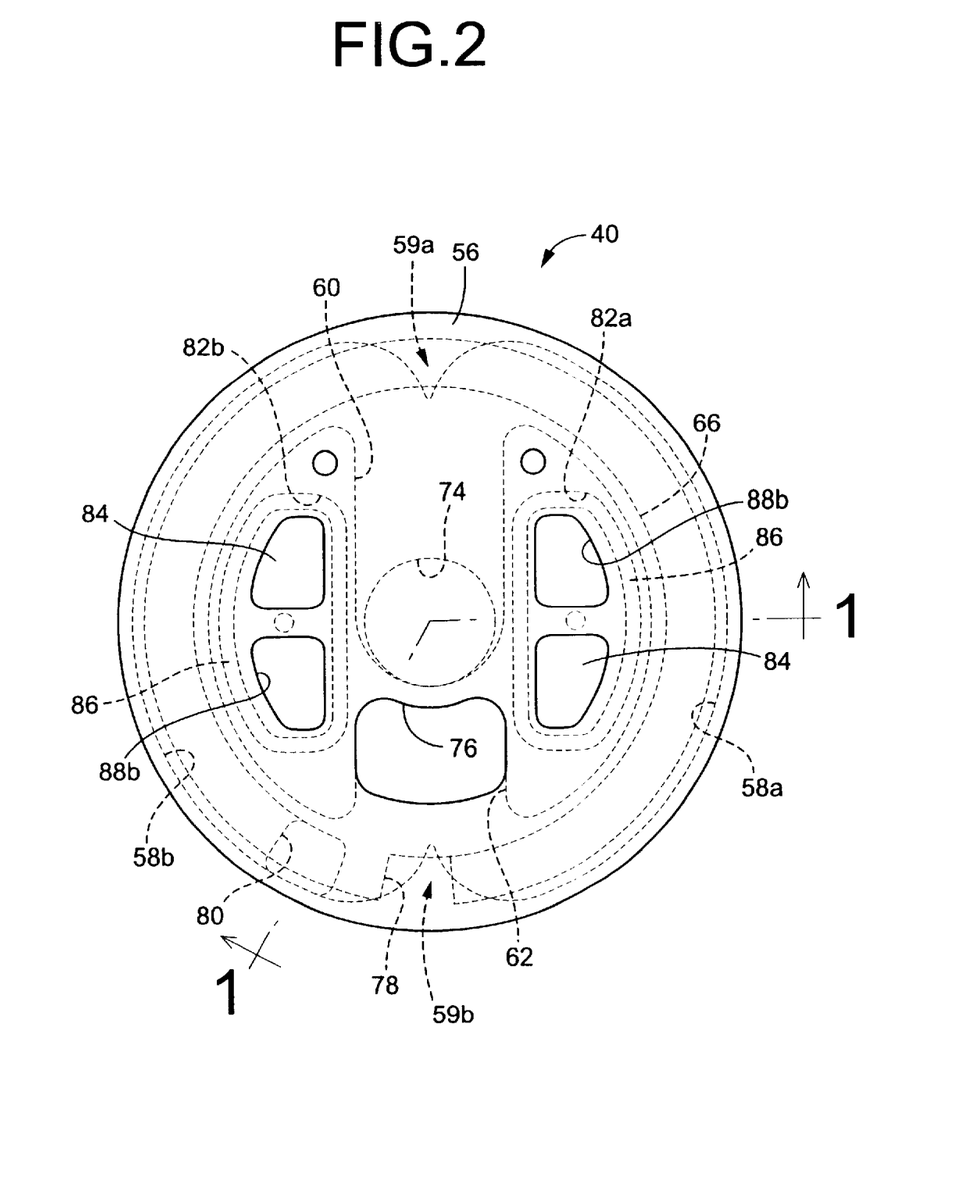
FIG. 2 is a top plane view of a partition member of the engine mount of FIG. 1.
Figure 3:
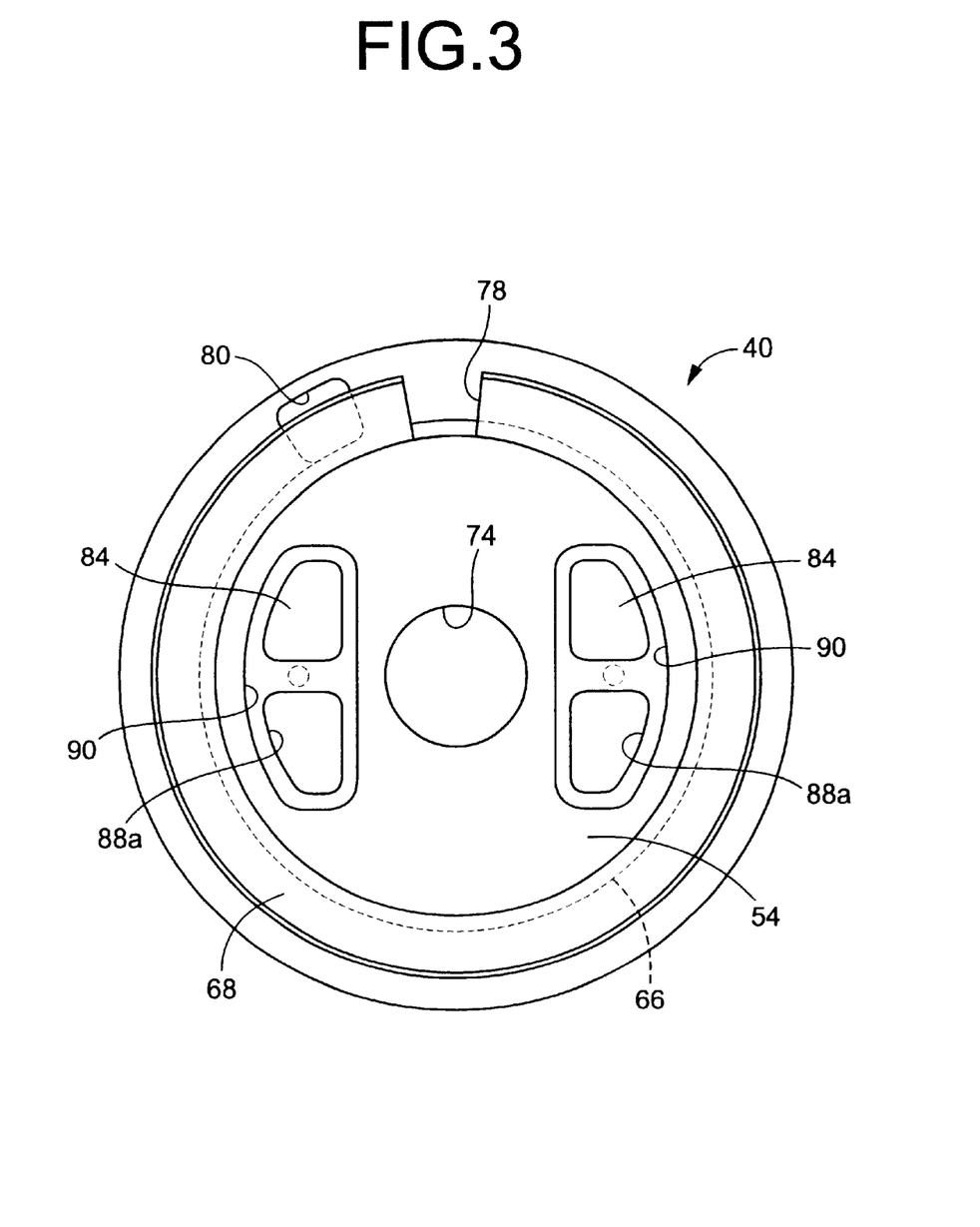
FIG. 3 is a bottom plane view of the partition member of FIG. 2.

Referring next to FIGS. 2 and 3, there are illustrated a top plane view and a bottom plane view of the partition member 40, respectively. The partition member 40 includes a partition-body member 54 having a thick-walled disk-like shape and a partition-cover member 56 having a thin-walled disk-like shape. The partition-body member 54 and the partition-cover member 56 are superposed on each other in the axial direction thereof, and are made of a hard material such as metal and a synthetic resin material.

The partition-body member 54 includes a pair of split grooves in the form of a first and a second semi-annular grooves 58a, 58b, which are formed at respective circumferential portion of the radially outer portion of the partition-body member 54, and which extend in the circumferential direction of the circumference of the partition-body member with a circumferential length slightly smaller than a half of the outer circumference of the partition member. The first and second semi-annular grooves 58a, 58b have a rectangular shape in cross section, and are open in the upper end surface of the body member 54. The first and second semi-annular grooves 58a, 58b are joined together at their circumferential open ends at respective circumferential positions 59a, 59b which are diametrically opposite to each other, so as to form a first and a second united grooves 60, 62. The first united groove 60 extends straight in a radially inward direction from the circumferential position 59a and terminated in the central portion of the partition-body member 54, while the second united groove 62 extends straight in a radially inward direction from the circumferential position 59*b* and terminated in a radially intermediate portion adjacent to the central portion of the partition-body member 54. The first and second united grooves 60, 62 have a rectangular shape in cross section with a cross sectional area equal to the sum of the cross sectional areas of the first and second semi-annular grooves 58*a*, 58*b*, and are open in the upper end surface of the body member 54.

The partition-body member 54 further includes an annular protrusion 68 which is formed at and axially downwardly protruded from a circumferential portion of the lower end surface of the partition-body member 54. The annular protrusion 68 is formed with a circumferential groove 66 extending in its circumferential direction with a length slightly smaller than the circumference thereof and being open in its circumferential surface.

The metal ring 44 covered with the sealing rubber layer 46 is press-fitted onto the outer circumferential portion of the annular protrusion 68. The opening of the circumferential groove 66 is fluid-tightly closed by the metal ring 44 with the sealing rubber layer 46 interposed therebetween, so that a first orifice passage 70 is formed in the circumferential portion of the partition member 40 so as to extend in its circumferential direction with a circumferential length slightly smaller than the outer circumference of the partition member 40.

Further, the partition-cover member 56 is superposed on the upper end surface of the partition-cover member 54 in the axial direction thereof, so that the openings of the first and second semi-annular grooves 58*a*, 58*b* and the openings of the first and second united grooves 60, 62 are closed by the partition-cover member 56, to thereby form a second orifice passage 72 which are divided into two passages at an intermediate portion thereof in its longitudinal direction.

The second orifice passage 72 is held in fluid communication at its one open end located on the side of the first united groove 60 with the equilibrium chamber 50 through a circular-shaped communication hole 74 as a second opening of the second orifice passage 72 which is formed through a portion of the bottom wall of the first united groove 60 which portion is located in the central portion of the partition member 40. The second orifice passage 72 is also held in fluid communication at its other open end located on the side of the second united groove 62 with the pressure-receiving chamber 48 through a generally rectangular-shaped communication hole 76 formed through a portion of the partition-cover member 56. Thus, the pressure-receiving and equilibrium chambers 48, 52 are held in fluid communication with each other through the second orifice passage 72, thereby permitting flow of the fluid through the second orifice passage 72 between the pressure-receiving chamber 48 and the equilibrium chamber 50. As is apparent from FIG. 2, the communication holes 72, 74, that is, the opposite open ends of the second orifice passage 72 are sufficiently closed to each other in the diametric direction as seen in a projection of the partition member 40 in the axial direction. This arrangement is effective to increased the entire length of the second orifice passage 72.

On the other hand, the first orifice passage 70 is held in fluid communication at one end with the equilibrium chamber 50 through a first communication hole 78, while being held in fluid communication at the other end with the second semi-annular grooves 58*b* of the second orifice passage 72 through a second communication hole 80. That is, the other circumferential open end of the first orifice passage 70 is held in fluid communication with the pressure-receiving chamber 48 through the second orifice passage 72 and the communication hole 76. In this arrangement, the non-compressible fluid is force to flow between the pressure-receiving chamber 48 and the equilibrium chamber 50 through the first orifice passage 70, due to a pressure difference between the two chambers 48, 50 upon application of the vibrational load to the engine mount 10.

In the present embodiment, the second orifice passage 72 has a higher ratio A/L than the first orifice passage 70, wherein "A" and "L" represent a cross sectional area and length of each orifice 70, 72, respectively. That is, the first orifice passage 70 is tuned to effectively a high damping effect with respect to low-frequency vibrations such as engine shakes based on flow of the fluid flowing through the first orifice passage 70. The second orifice passage 72 is tuned to exhibit a low dynamic spring constant with respect to high-frequency vibrations such as engine idling vibrations based on resonance of the fluid flowing through the second orifice passage 72.

The partition-body member 54 further includes a pair of accommodating recesses in the form of a first and a second accommodating recess 82*a*, 82*b*, which are disposed in an open space of the partition-body member 54 interposed between the first and second semi-annular grooves 58*a*, 58*b* and the first and second united grooves 60, 62, and which are open in the upper end surface of the partition-body member 54. More specifically described, the first and second accommodating recesses 82*a*, 82*b* are respectively formed in diametrically-opposite radially intermediate portions of the partition-body member 54 such that the first and second recesses 82*a*, 82*b* are disposed radially outwardly of the first and second united grooves 60, 62 and radially inwardly of the first and second semi-annular grooves 58*a*, 58*b*. That is, each of the first and second accommodating recesses 82*a*, 82*b* extends at the corresponding radially intermediate portions of the partition-body member 54, which is interposed between the first and second united grooves 60, 62 and the corresponding one of the first and second semi-annular grooves 58*a*, 58*b* in the radial direction. In the accommodating recesses 82*a*, 82*b*, there are installed a pair of rubber plates 84, respectively. The rubber plates 84 have respective configurations corresponding to those of the accommodating recesses 82*a*, 82*b*. Like the first and second united grooves 60, 62 and the first and second semi-annular grooves 58*a*, 58*b*, the openings of the first and second accommodating recesses 82*a*, 82*b* are fluid-tightly closed by the partition-cover member 56 axially superposed thereon.

Each of the rubber plates 84 has a thickness smaller than a value corresponding to the depth of the corresponding accommodating recess 82. The rubber plate 84 has an axial protrusion at its peripheral portion that protrudes axially outward direction from the both surfaces of the rubber plate 84. The axial protrusion of the rubber plate 84 is compressed by and between the bottom wall of the accommodating recess 82 and the partition-cover member 56, so that the rubber plate 84 is located in an axially middle portion of the accommodating recess 82 so as to extend in a direction perpendicular to the axial (depth) direction. That is, the rubber plate 84 fluid-tightly divides the accommodating recess 82 into a bottom-side space and a cover-side space. The bottom-side space of the accommodating recess 82 is held in fluid communication with the equilibrium chamber 50 through a fluid passage 88*a* formed through the bottom wall of the accommodating recess 82, while the cover side space of the accommodating recess 82 is held in fluid communication with the pressure-receiving chamber 48 through a fluid passage 88*b* formed through the corresponding portion of the partition-cover member 56. In this condition, the rubber plate 84 is subjected at its upper surface to the pressure of the fluid in the pressure-receiving chamber 48 and at its lower surface to the pressure of the fluid in the equilibrium chamber 50. The rubber plate 84 is elastically deformed based on the pressure difference between the fluid in the pressure-receiving chamber 48 and the equilibrium chamber 50, whereby the substantial flow of the fluid between the pressure-receiving chamber 48 and the equilibrium chamber 50 through respective fluid passages 88a, 88b is induced by an amount of deformation of the rubber plate 84.

While resistance to the fluid flow through the first and second orifice passage 70, 72 significantly is increased, upon application of high-frequency vibrations such as booming noises to the elastic mount 10, the rubber plates 84 permit a substantial flow of the fluid between the pressure-receiving chamber 48 and the equilibrium chamber 50 through the fluid passages 82b, 82a on the both sides thereof, owing to its elastic deformation thereof, for thereby reducing or absorbing increase of the pressure of the fluid in the pressure-receiving chamber 48. That is, the movable plates 48 and the fluid passages 88a, 88b formed on the both sides of the movable plate 48 are arranged to provide a sufficiently low dynamic spring constant based on resonance of the fluid flow through the fluid passages 88a, 88b, with respect to such high-frequency vibrations. Therefore the engine mount 10 exhibit an excellent vibration isolating effect even to the high-frequency vibrations. In particular, the partition-body member 54 further includes a pair of cavities 90 open in its lower end surface and located in respective circumferential positions corresponding to that of the accommodating recesses 82a, 82b. The provision of the cavities 90 are effective to reduce the thickness of the bottom walls of the respective accommodating recesses 82, resulting in a sufficiently reduced length of the fluid passages 88b. Thus, each of the fluid passages 88a, 88b has a higher ratio A/L (wherein "A" and "L" respectively represent a cross sectional area and a length of each passage 88) than the first and second orifice passages 70, 72.

The above-described function of the fluid passages 88a, 88b is also deteriorated due to a significant increase of resistance to the fluid flow through the fluid passages 88a, 88b, upon application of higher-frequency vibrations whose frequency bands is higher than the frequency band to which the fluid passages 88a, 88b are tuned. In the present embodiment, however, the above-indicated restricted fluid passage 52 is arranged to have a suitable cross sectional area and length thereof for exhibiting a sufficiently low dynamic spring constant or high vibration isolating effect, based on flow or resonance of the fluid flowing therethrough, with respect to such higher-frequency vibrations. In particular, the provision of the pocket 27 in the elastic body 16 facilitates the elastic deformation of the elastic body 16, effectively increasing an amount of flow in the pressure-receiving chamber 48 and an amount of flow of the fluid flowing through the restricted fluid passage 52, resulting in a further improved vibration damping or isolating effect.

The engine mount 10 of the present embodiment further includes an actuator in the form of a pneumatically operated actuator 92 of vacuum type. The actuator 92 is secured to and supported by the lower open end of the support sleeve 32, so as to be disposed or installed under the second mounting member 14. The vacuum-type pneumatically operated actuator 92 includes a generally disk-like shaped outer wall member 94 made of hard materials such as metal and synthetic resin materials, and a generally disk-like shaped elastic diaphragm 96 which is made of a rubber material and which is superposed at its outer circumferential portion on the upper surface of the outer wall member 94 in the axial direction thereof. A metallic sleeve 95 is engaged with the outer peripheral portion of the outer wall member 94, while a fixing sleeve 97 is bonded to the outer peripheral portion of the elastic diaphragm 96 in the process of vulcanization of a rubber material for forming the elastic diaphragm 96. The metallic sleeve 95 and the fixing sleeve 97 have respective outward flange portions at their axially upper end portions, and are superposed on each other at their outward flange portions in the axial direction and at their cylindrical portions in the radial direction. The mutually superposed outward flange portions of the metallic sleeve 95 and the fixing sleeve 97 are clamped by and between the axially lower end face of the metallic ring 44 and the calking portion 45 of the support sleeve 32, so that the outer wall member 94 and the elastic diaphragm 96 are fixedly secured to the support sleeve 32, in other words, are fixedly secured to the second mounting member 14 via the support sleeve 32. In this arrangement, the outer wall member 94 and the elastic diaphragm 96 are fluid-tightly press-fitted on each other at their peripheral portions, to thereby define therebetween a working air chamber 98 air-tightly enclosed from the exterior space. The elastic diaphragm 96 cooperates with the elastic diaphragm 42 to form therebetween a deformation-allowing chamber 112 as a static air chamber on the other side of the elastic diaphragm 96 remote from the working air chamber 98. The deformation-allowing chamber 112 serves as a space for allowing the deformation of the flexible diaphragm 42 and is always held in communication with the atmosphere via a communication hole 110 formed through the cylindrical portions of the metallic sleeve 95 and the fixing sleeve 97.

In a central portion of the elastic diaphragm 96, there is embedded an inverted cup-shaped pushing member 100 made of metal which is bonded to the elastic diaphragm 96 in the process of vulcanization of a rubber material of the elastic diaphragm 96. The top wall of the pushing member 100 serves as a pressing surface 101 which is flat and has a circular shape. In the central portion of the working air chamber 98, a biasing member in the form of a coil spring 102 is disposed in a compressed state between the outer wall member 94 and the elastic diaphragm 96. In this arrangement, the coil spring 102 always biases the pushing member 100 embedded in the central portion of the elastic diaphragm 96 in the axially upward direction, that is in the direction remote from the outer wall member 94.

The outer wall member 94 includes an integrally-formed central protrusion 104 which is protruded in the axially upward direction of the member 94 with a hollow cylindrical shape. A connector 106 is also integrally formed at the central portion of the top wall of the central protrusion 104, so as to extend in the axially downward direction. To this connector 106, is connected an air piping system (not shown) including a switch valve, whereby the working air chamber 98 is alternately connected through the air piping system to a vacuum source (not shown) and the atmosphere by the switching operation of the switch valve. When the working air chamber 98 is connected to the atmosphere, the pushing member 100 biased upwardly based on a biasing force of the coil spring 102. When the working air chamber 98 is connected to the vacuum source, and the pressure in the working air chamber 98 is accordingly reduced below the atmospheric pressure, the pushing member 100 is moved in the axially downward, namely, is retracted toward the outer wall member 94, due to the pressure difference between the working air chamber 98 and the deformation-allowing chamber (which is always held in communication with the atmosphere), against the biasing force of the coil spring 102. Meanwhile, the elastic diaphragm 96 further includes an annular rubber buffer 108, which is integrally formed in the central portion of the lower surface of the elastic diaphragm 96 so as to protrude toward the top wall of the central protrusion 104, so that the amount of displacement of the pushing member 104 in the retracted direction is effectively restricted by an the abutting contact between the rubber buffer 108 and the top wall of the central protrusion 104.

As is illustrated in FIG. 1, the thus constructed pneumatically operated actuator 92 is incorporated in the engine mount 10 such that the pressing pressure surface 101 of the pushing member 100 is forcedly onto the communication hole 74 formed in the central portion of the lower surface of the partition member 40, with the equilibrium chamber, with the flexible diaphragm 42 compressed therebetween.

When the atmospheric pressure is applied to the working air chamber 98 of the actuator 92, the pushing member 100 biased upwardly by the coil spring 102 forces the central portion of the flexible diaphragm 42 onto the lower surface of the partition member 40, more specifically, the peripheral portion of the opening of the second orifice passage 72 (the communication hole 74), as seen in FIG. 1. In this condition, the opening of the second orifice passage 72 is fluid-tightly closed by the flexible diaphragm 42, thereby disabling the second orifice passage 72 for its fluid communication with the equilibrium chamber 50. When the negative pressure is applied to the working air chamber 98, on the other hand, the pressure in the working air chamber is reduced below the atmospheric pressure, and the pushing member 100 is retracted away from the flexible diaphragm 42 due to a pressure difference between the two chambers 98 and 112, against the biasing force of the coil spring 102. Accordingly, the flexible diaphragm 42 is moved away from the lower surface of the partition member 40, whereby the communication hole 74 is open to the equilibrium chamber 46, so that the second orifice passage 72 is held in fluid communication with the equilibrium chamber 50.

Namely, with the second orifice passage 72 being disabled by connecting the working air chamber 98 to the atmosphere, the engine mount 10 can exhibit a high damping effect with respect to the low-frequency and large-amplitude vibrations such as engine shakes, based on the flow of the fluid through the first orifice passage 70 between the pressure-receiving and equilibrium chambers 48, 50. In addition, the engine mount 10 a low dynamic spring constant with respect to the high-frequency and small-amplitude vibrations, by absorbing or reducing the pressure change of the fluid in the pressure-receiving chamber 48 based on the substantial flow of the fluid flowing through the fluid passages 88a, 88b between the pressure-receiving and equilibrium chambers 48, 50, owing to the displacement of the rubber plates 84. In the present embodiment, the engine mount 10 can exhibit excellent vibration damping effect with respect to the input vibrations having a frequency higher than the high-frequency band to which the fluid passages 88a, 88b are tuned, based on the resonance of the fluid flowing through the restricted fluid passage 52 formed in the pressure-receiving chamber 52.

With the second orifice passage 72 being enable by connecting the working air chamber 98 to the vacuum source, the engine mount 10 can exhibit an excellent vibration isolating effect with respect to the medium-frequency and medium-amplitude vibrations such as engine idling vibrations based on the resonance of the fluid flowing through the second orifice passage 72, since the fluid is likely to flow between the pressure-receiving and equilibrium chambers 48, 50 through the second orifice passage 72 rather than the first orifice passage 70 which is more resistive to the fluid flowing therethrough than the second orifice passage 72.

Thus, the engine mount 10 of the present embodiment is capable of changing its damping characteristics depending upon the driving condition of the vehicle, by selectively connecting the working air chamber 98 to the vacuum source and the atmosphere so that the fluid is caused to flow selectively through the first and second orifice passages 70, 72. That is, the damping characteristics of the engine mount 10 are suitably changed depending upon the specific frequency of the input vibrations desired to be damped.

In the engine mount 10 of the present embodiment constructed as described above, the second orifice passage 72 is arranged such that the second orifice passage 72 is open at one end in the central portion of the lower surface of the partition member 40 for fluid communication with the equilibrium chamber 50 and extends radially outwardly from the central portion to the circumferential portion of the partition member 40. At a circumferential position of the circumferential portion of the partition member 40, the second orifice passage 72 is divided into the first and second semi-annular grooves 58a, 58b which extend in the circumferential direction along the circumference of the partition member 40. The first and second semi-annular grooves 58a, 58b are connected together at their circumferential ends. This arrangement effectively provides sufficiently large spaces for accommodating the rubber plates 84a, 84b in the respective radially intermediate portions of the partition member 40 which are located radially inward of the semi-annular grooves 58a, 58b, while assuring a sufficient length and cross sectional area of the second orifice passage 72, resulting in a high degree of freedom in tuning of the second orifice passage 72.

That is, the second orifice passage 72 and the rubber plates 84a, 84b are desirably arranged in the partition member 40 with improved space utilization. Therefore, the engine mount 10 is capable of exhibiting an excellent vibration isolating effect with respect to the high-frequency vibrations by using the rubber plates 84, 84, and also exhibiting an excellent vibration isolating effect with respect to the medium-frequency vibrations by using the second orifice passage 72. The present engine mount 10 is capable of providing excellent damping effects with respect to the input vibrations over a wide frequency range.

Moreover, the first orifice passage 70 is also arrange in the circumferential portion of the partition member 40 such that the first orifice passage 70 overlaps the second orifice passage 72 in the axial direction. This arrangement permits sufficient lengths of both of the first and second orifice passages 70, 72. Since the first orifice passage 70 is formed at an axial position of the partition member 40 which is different from that of the second orifice member 72 and the movable rubber plates 84a, 84b, the first orifice passage 70 can be formed with a sufficient cross sectional area and a sufficient length, without restricting the spaces used for the second orifice passage 72 and the movable rubber plates 84a, 84b, leading to a high degree of freedom in tuning the first orifice passage 70.

In the present engine mount 10, the communication hole 74 through which the second orifice passage 72 is communicated with the equilibrium chamber 50, is formed in the central portion of the lower surface of the partition member 40, so that the generally central portion of the flexible diaphragm 42 is pressed onto and retracted from the communication hole 74. This makes it possible to eliminate a concentration of the stress to a local portion of the flexible diaphragm 42, upon operation of the actuator 92 for reciprocally moving the central portion of the flexible diaphragm, providing an improved durability of the flexible diaphragm 42. Further, the deformation of the flexible diaphragm 42 is restricted only in the central portion thereof and is effectively provided in the radially outward portion thereof, assuring a required amount of change of the volume of the equilibrium chamber 50. In addition, the pushing member 100 as an output member of the actuator 92 can be located in the central portion of the actuator 92 for moving the central portion of the flexible diaphragm 96 toward and away from the communication hole 74 of the partition member 40. Thus, the actuator 92 of the engine mount 10 is simple in construction and assures an excellent its output characteristics and operation with high stability.

While the presently preferred embodiment of this invention has been described above in detail for the illustrative purpose only, it is to be understood that the present invention is not limited to the details of the illustrated embodiments, but may be otherwise embodied.

For instance, the size of the accommodating recesses 82 and the spring stiffness of the movable rubber plate 84 are not particularly limited, but may be suitably determined taking into account the required vibration damping characteristics of the device. It may be possible, for example, that the first and second accommodating recesses 82a, 82b and the rubber plates 84 respectively accommodated therein are different in size and spring stiffness, from each other, so as to be tuned respective frequency bands. This arrangement permits that the vibration damping device exhibits vibration damping or isolating effect over a further extended frequency band.

The resonance member 22 and the pocket 27 are not essential to practice the present invention.

The structure for assembling the actuator 92 to the second mounting member 14 is not limited to those of the illustrated embodiment wherein the support cylinder 32 is used, but may be embodied by any other various kinds of structures. For instance, the second mounting member 14 may be modified to be elongated in the axially downward direction so that the partition member 40 and the actuator 92 may be incorporated within the bore of the elongated portion of the second mounting member 14.

The actuator is not limited to the vacuum-type pneumatically operated actuator 92 in the illustrated embodiment, but may be embodied by an electromagnetic-type, an electric-type actuator, or the like.

While the illustrated embodiment of the invention takes the form of a fluid-filled engine mount for a motor vehicle, the principle of the present invention may be equally applicable to various other fluid-filled elastic mounts for use on an automotive vehicle, such as body mounts, and various kinds of fluid-filled vibration damping device for various devices or equipment other than the automotive vehicles.

It is to be understood that the present invention may be embodied with various other changes, modifications and improvements, which may occur to those skilled in the art, without departing from the sprit and scope of the invention defined in the following claims:

What is claimed is:

1. A fluid-filled vibration damping device comprising:
    a first mounting member and a second mounting member including a cylindrical portion, which are spaced apart from each other such that one of axially opposite open end of said cylindrical portion of said second mounting member is opposed to said first mounting member;
    an elastic body elastically connecting said first and second mounting member such that said open end of said cylindrical portion of said second mounting member is fluid-tightly closed by said elastic body;
    a flexible diaphragm fluid-tightly closing the other open end of said cylindrical portion of said second mounting member;
    a partition member having a generally cylindrical shape, which is disposed between said elastic body and said flexible diaphragm and fixedly supported by said second mounting member, said partition member cooperating with said elastic body to define therebetween a pressure-receiving chamber filled with a non-compressible fluid, to which a vibrational load is applied, and cooperating with said flexible diaphragm to define therebetween an equilibrium chamber filled with the non-compressible fluid, the volume of which is variable;
    a first orifice passage formed in said partition member for fluid communication between said pressure-receiving chamber and said equilibrium chamber;
    a second orifice passage formed in said partition member and communicating at a first open end thereof with said pressure-receiving chamber and at a second open end thereof with said equilibrium chamber for fluid communication between said pressure-receiving chamber and said equilibrium, said second orifice passage being tuned to a frequency band higher than a frequency band to which the first orifice passage is tuned,
    said second orifice passage including a pair of split passages formed at respective circumferential positions of said partition member that are opposed to each other in a diametric direction of said partition member, and each extending in a circumferential direction of said partition member with a circumferential length substantially equal to a value corresponding to a half of an entire circumference of said partition member, said pair of said split passages being open at ones of opposite circumferential ends thereof to said pressure-receiving chamber through said first open end of said second orifice passage, and being joined together at the other circumferential ends at a first circumferential position of said partition member and radially inwardly extend from said first circumferential position to a substantially central portion of said partition member at which the other circumferential ends of said split passages are open to said equilibrium chamber through said second open end of said second orifice passage;
    a pair of movable members respectively disposed in diametrically-opposite radially intermediate portions of said partition member so as to extend between said respective split passages and said second open end of said second orifice passage, each of said pair of movable members being displaceable by a suitable amount of distance, based on a pressure difference between a pressure of the fluid in said pressure-receiving chamber which is applied to one of opposite surfaces of said movable member, and a pressure of the fluid in said equilibrium chamber which is applied to the other surface of said movable member; and
    an actuator disposed on one of opposite sides of said flexible diaphragm remote from said equilibrium chamber and being operable to displace said flexible diaphragm in a direction toward and away from said second open end of said second orifice passage formed in said partition member, so as to close and open said second open end of said second orifice passage, for inhibiting and permitting said fluid communication through said second orifice passage.

2. A fluid-filled vibration damping device according to claim 1, wherein said split passages are also joined together at said ones of opposite circumferential ends at a second circumferential position of said partition member and radially inwardly extend from said second circumferential position to a radially inward portion of said partition member at which said ones of opposite circumferential ends of said split passages are open to said pressure-receiving chamber through said first open end of said second orifice passage, said second circumferential position being diametrically opposed to said first circumferential positions at which the other circumferential ends of said split passages are joined together.

3. A fluid-filled vibration damping device according to claim 1, wherein said first and second orifice passages are formed in the circumferential portion of said partition member such that said first and second orifice passages are superposed on each other in the axial direction of said partition member, and extend in the circumferential direction of said partition member, said first orifice passage being located adjacent to said equilibrium chamber so that said first orifice passage being held in fluid communication with said pressure-receiving chamber through said second orifice passage.

4. A fluid-filled vibration damping device according to claim 1, wherein said partition member includes: a cylindrical body member having a groove open in one of opposite surfaces thereof, and a pair of accommodating recesses which are respectively disposed in diametrically-opposite portions located radially inward of said groove, said accommodating recesses being open in said one of opposite surfaces of said partition member, being adapted to accommodate therein said pair of said movable members, respectively; and a closure member superposed on said one of opposite surfaces of said body member so as to close openings of said groove to define therebetween said second orifice passage and so as to close said openings of said pair of said accommodating recesses in order to support therebetween said movable members, said closure member including first communication passages formed therethrough at respective portions located adjacent to said pair of said accommodating recesses, so that said pressure of said fluid in said pressure-receiving chamber is applied to ones of opposite surfaces of said movable members through said first communication passage, respectively, and bottom walls of said pair of said accommodating recesses having second communication passages formed therethrough, so that the pressure of said fluid in said equilibrium chamber is applied to the other surfaces of said movable members through said second communication passages, respectively.

5. A fluid-filled vibration damping device according to claim 4, wherein said pair of said movable members comprises a pair of movable rubber plates, each of said movable rubber plates being supported at peripheral portion thereof by and between said closure member and said bottom surface of said accommodating recess such that said movable rubber plate is displaceable toward and away from said closure member and said bottom surface of said accommodating recess, and a maximum amount of displacement of each of said movable rubber plates being restricted by an abutting contact of said movable rubber plates with said closure member and said bottom surface of said accommodating recess.

6. A fluid-filled vibration damping device according to claim 4, wherein one of said first and second mounting members is attached to a power unit of an automotive vehicle and the other of said first and second mounting members is attached to a body of the automotive vehicle, said first and second orifice passages being respectively tuned to a low frequency band corresponding to a vibration of engine shakes and an medium frequency band corresponding to a vibration of engine idling, and said first and second communication passages through which the fluid flows upon displacement of said movable members, being tuned to a high frequency band.

7. A fluid-filled vibration damping device according to claim 1, wherein said partition member includes a circumferential groove extending in an circumferential direction thereof and being open in an outer circumferential surface thereof an opening of said circumferential groove is fluid-tightly closed by said cylindrical portion of said second mounting member to thereby define said first orifice passage.

8. A fluid-filled vibration damping device according to claim 1, wherein said actuator comprises a pneumatically operated actuator including a fluid-tightly closed working air chamber and a piston device which is movable toward and away from said partition member based on a change of the air pressure applied to said working air chamber, said piston device being moved toward and away from said partition member so as to displace said flexible diaphragm toward and away from said partition member.

9. A fluid-filled vibration damping device according to claim 8, further comprising: a rigid cover member being supported by said second mounting member on the side of the other open end of said cylindrical portion of said second mounting member such that said cover member cooperate with said flexible diaphragm to define therebetween a working space; an elastic diaphragm disposed within said working space so as to cooperate with said cover member to define therebetween said working air chamber; and an air conduit connected to said working air chamber for applying said air pressure to said working air chamber, said piston device being disposed within said working air chamber, for thereby cooperating with said pneumatically operated actuator.

10. A fluid-filled vibration damping device according to claim 9, wherein said elastic diaphragm disposed within said working space cooperating with said flexible diaphragm to divide therebetween a static air chamber, said vibration damping device further comprising an air passage through which said static air chamber is held in communicated with an external area.

11. A fluid-filled vibration damping device according to claim 9, further comprising a biasing member disposed between said piston device and cover member, for forcing said piston device onto said flexible diaphragm so that said flexible diaphragm closes said second open end of said second orifice passage, wherein said air conduit being alternately connected to and disconnected from an external vacuum source and an atmosphere for alternately applying a negative pressure and atmospheric pressure to said working air chamber, so that said flexible diaphragm is moved away from said second open end of said second orifice passage, against a biasing force of said biasing member, when said air conduit is connected to said vacuum source.

12. A fluid-filled vibration damping device according to claim 1, wherein said actuator includes an output member which is secured to a generally central portion of said flexible diaphragm.

13. A fluid-filled vibration damping device according to claim 1, wherein said flexible diaphragm includes a central portion whose wall thickness is larger than that of the outer peripheral portion thereof, at said central portion of said flexible diaphragm being adapted to be pressed onto a central portion of said partition member in which said second open end of said second orifice passage is opened.

14. A fluid-filled vibration damping device according to claim 1, wherein said partition member has a diameter larger than an inner diameter of said pressure-receiving chamber and is calked at a peripheral portion thereof by said second mounting member in an axial direction, and said first and/or second orifice passage being formed in said circumferential portion of said partition member so as to have an outside diameter larger than said inner diameter of said pressure-receiving chamber.

* * * * *